United States Patent [19]
Crorey

[11] Patent Number: 5,738,203
[45] Date of Patent: Apr. 14, 1998

[54] APPARATUS FOR TRANSLATING HARMONIC MOTION

[75] Inventor: David J. Crorey, Utica, Mich.

[73] Assignee: ISI Norgren Inc., Anoka, Minn.

[21] Appl. No.: 534,240

[22] Filed: Sep. 26, 1995

[51] Int. Cl.$^6$ .................................................. B65G 47/34
[52] U.S. Cl. ........................... 198/463.3; 198/468.6; 198/809
[58] Field of Search ................ 198/463.3, 468.8, 198/809, 861.1, 774.3, 468.6

[56] References Cited

U.S. PATENT DOCUMENTS

| | | | |
|---|---|---|---|
| 3,512,420 | 5/1970 | Farmer . | |
| 4,224,831 | 9/1980 | Nilsson . | |
| 4,685,345 | 8/1987 | Gruss . | |
| 4,750,605 | 6/1988 | Brems et al. | 198/468.8 |
| 4,763,773 | 8/1988 | Kawarabashi et al. | 198/463.3 |
| 4,781,285 | 11/1988 | Schlatter et al. . | |
| 4,936,438 | 6/1990 | Waineo | 198/468.6 |
| 4,947,698 | 8/1990 | Dodds et al. . | |
| 5,449,268 | 9/1995 | Lingo et al. | 198/468.6 |

Primary Examiner—Joseph E. Valenza
Attorney, Agent, or Firm—Young & Basile, P.C.

[57] ABSTRACT

An apparatus for converting rotational movement of a rotary member to harmonic linear motion for moving an article transfer apparatus between a first position and a second position. The apparatus provides a follower pivotally connected to the extending end of the rotary member, and a planar support plate having a slotted aperture for receiving the follower of the rotary member. A pair of opposing low friction planar guides slidingly support the support plate of the article transfer apparatus for movement in a predetermined plane. When the rotary member rotates, the follower moves along the slotted aperture of the support plate, and the support plate slides along the planar guides thus imparting linear motion to the article transfer apparatus. When the rotary member is rotated at a substantially constant rotary speed, the linear motion translated to the article transfer apparatus is best described as harmonic motion. The article transfer apparatus may provide a conveyor for transferring an article or workpiece along a predetermined path of travel. The conveyor may have its own independent power means for powering the conveyor.

19 Claims, 3 Drawing Sheets

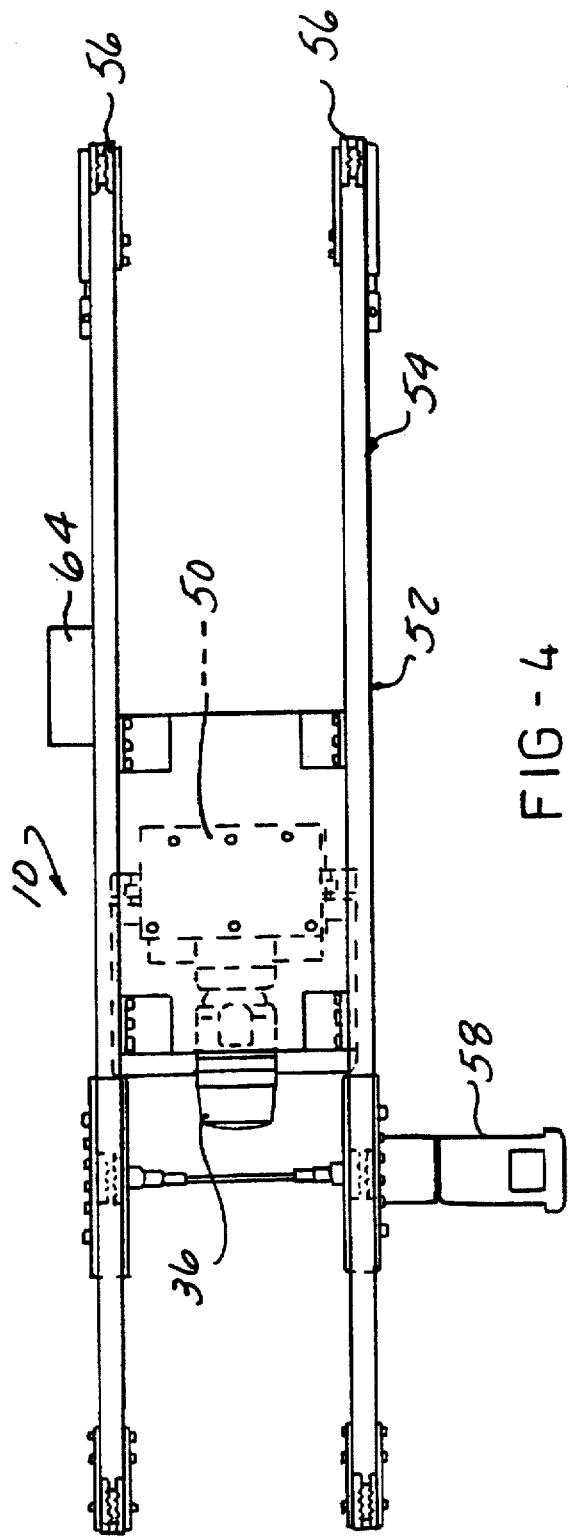
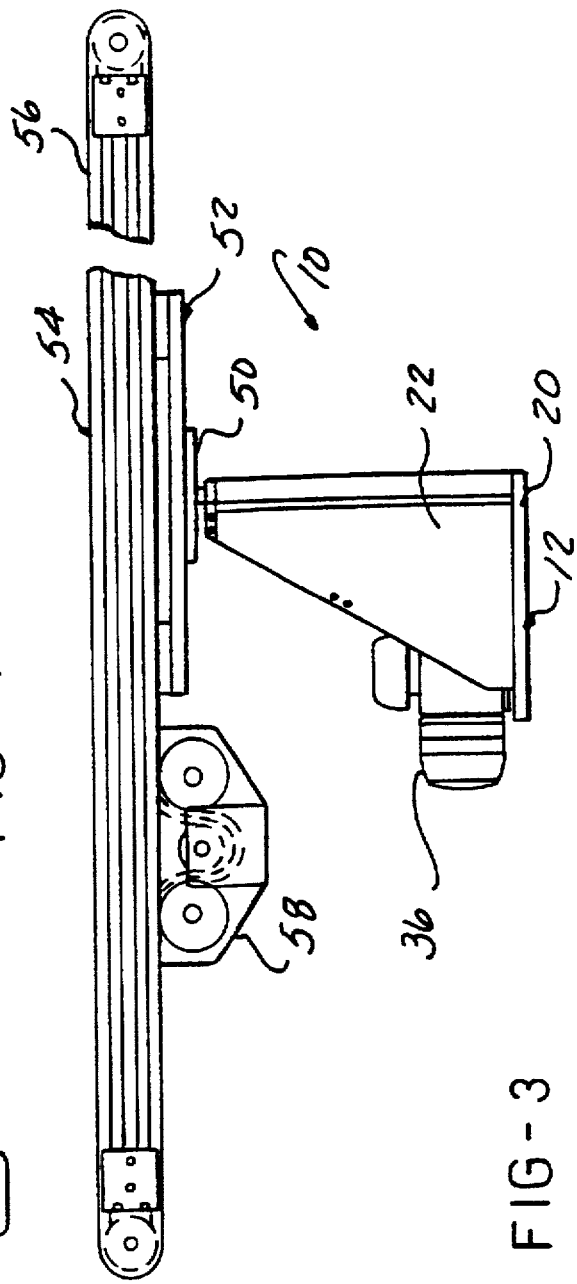
FIG-4
FIG-3

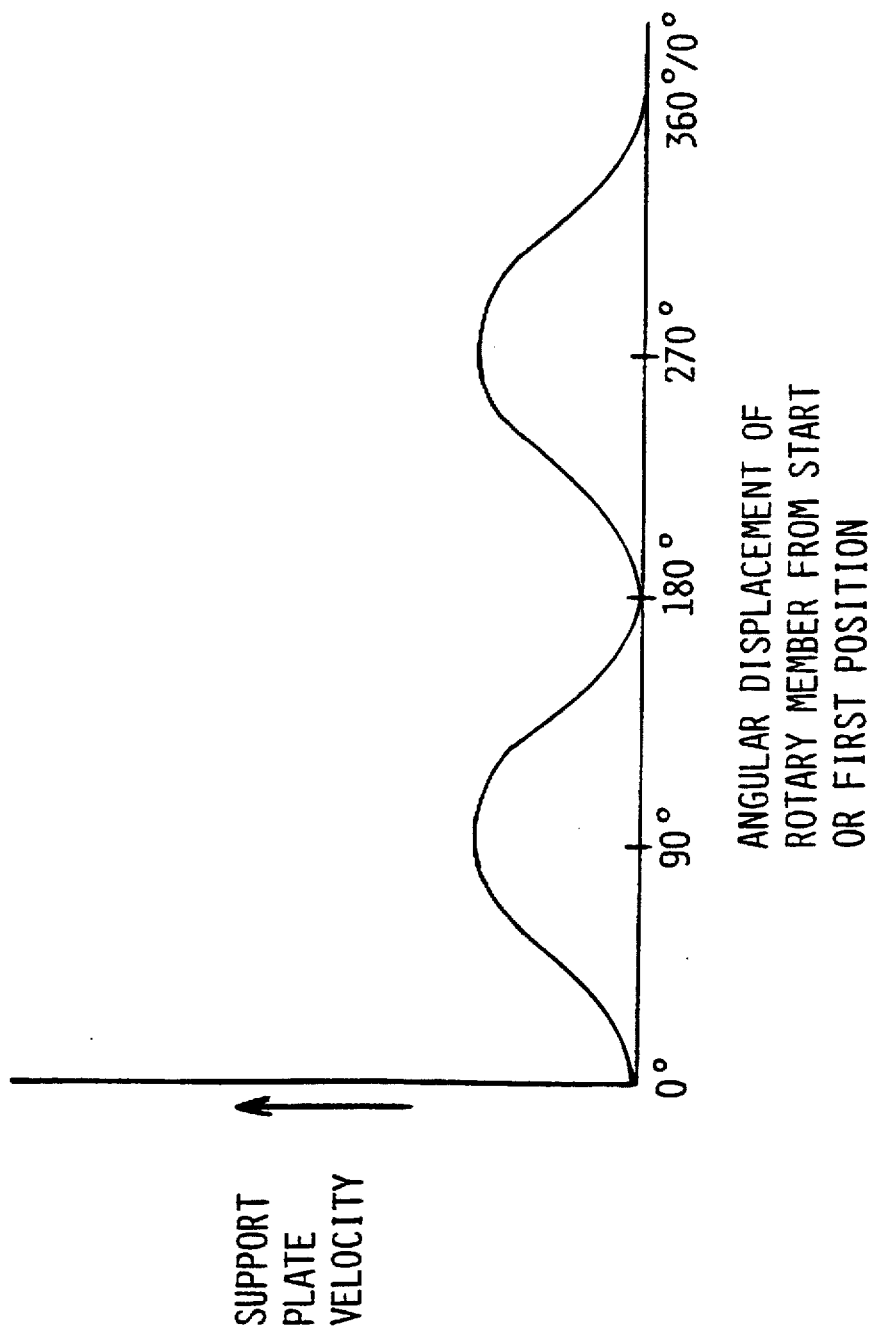

APPARATUS FOR TRANSLATING HARMONIC MOTION

RELATED APPLICATIONS

The present invention relates to U.S. Pat. No. 5,549,442 entitled ARTICLE TRANSFER APPARATUS.

FIELD OF THE INVENTION

The present invention relates to harmonic motion for article transfer apparatuses, and more particularly, an apparatus for converting rotational movement of a rotary member to harmonic linear motion for lifting and lowering an article transfer apparatus.

BACKGROUND OF THE INVENTION

In general, many devices have been utilized and designed to orient and control the positioning of an article transfer apparatus. When such article transfer apparatuses are reciprocally moved between a rested first position and a rested second position, the article transfer apparatus must typically be moved slowly and cautiously when approaching and exiting the first and second positions. Typically, the weight and load of the article transfer apparatus does not allow for quick maneuvering, especially when the article transfer apparatus must be accurately aligned with corresponding industrial processing equipment. Any movement of the article transfer apparatus occurring between and beyond the rested first and second positions should occur as rapidly as possible in order to reduce cycle times and increase the efficiency of the process.

This type of desired motion, i.e. having a slow start and finish with rapid movement therebetween, can be provided by harmonic motion. Harmonic motion may be described as having a sinusoidal wave length wherein the object starts at a rested position and gradually accelerates to a maximum speed over a medial portion of the travel distance. Once the object is beyond the medial portion of the travel distance, the object begins to gradually decelerate until the object reaches its second rested position at the end of its travel. Such motion is typically provided by a hydraulic drive or pneumatic drive which utilizes a feed and bleed type system for providing the harmonic motion. Such systems are generally complex in design and expensive to maintain thus effecting the efficiency of the apparatus and its associated process.

Thus, it would be desirable to provide an inexpensive, durable and reliable apparatus for providing harmonic motion for the positioning of an article transfer apparatus between two positions.

SUMMARY OF THE INVENTION

The present invention provides an apparatus for converting rotational movement of a rotary member to harmonic linear motion for moving an article transfer apparatus between a first position and a second position. The apparatus provides a follower pivotally connected to the extending end of the rotary member, and a planar support plate having a slotted aperture for receiving the follower of the rotary member. A pair of opposing low friction planar guides slidingly support the support plate of the article transfer apparatus for movement in a predetermined plane. When the rotary member rotates, the follower moves along the slotted aperture of the support plate, and the support plate slides along the planar guides thus translating linear motion to the article transfer apparatus.

When the rotary member is rotated at a substantially constant rotary speed, the linear motion translated to the article transfer apparatus is best described as harmonic motion. The harmonic motion is characterized by having the article transfer apparatus start from an effective rest position, wherein the rotary member begins to rotate at a constant rotational velocity, thus causing the article transfer apparatus to gradually accelerate to a maximum speed over a medial portion of the rotation of the rotary member. Once beyond the medial-portion of the rotation, the article transfer apparatus begins to decelerate, sinusoidally, to an effective second rest position wherein the rotary member ends its rotation.

The article transfer apparatus may provide a conveying means for transferring an article or workpiece along a predetermined path of travel. An independent power means may be utilized for powering the conveying means.

Thus, the object of the present invention is to provide a new and improved apparatus for providing a simple, inexpensive and reliable apparatus for moving an article transfer apparatus between a first position and a second position through the use of harmonic linear motion.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a plane side view showing a conveying means connected to the support plate of the present invention.

FIG. 4 is a plane top view showing the conveying means connected to the support plate of the present invention.

FIG. 5 shows a support plate velocity-rotary member angular displacement curve for the apparatus shown in FIGS. 1–4.

DESCRIPTION OF THE PREFERRED EMBODIMENT

Figure 1:
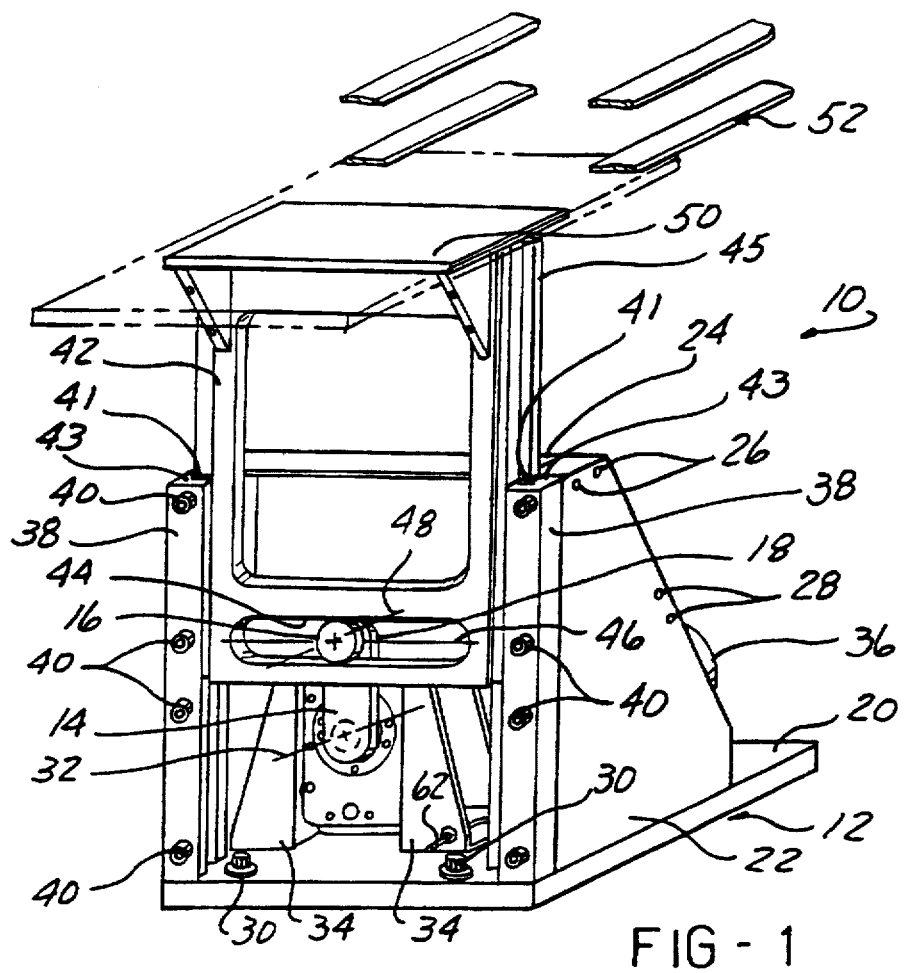
FIG. 1 is a perspective view showing the present invention in a raised position.

FIGS. 1–4 show the apparatus 10 according to the present invention. The apparatus 10 provides a base member 12 for supporting a rotary member 14 and a means for rotating the rotary member. The base member 12 also supports a planar guide means for guiding movement of an article transfer means along a predetermined plane. A follower 16 is pivotally connected to an extending end 18 of the rotary member 14 and is received by a slot defining means provided in the article transfer means. As will be described in greater detail below, the rotary member 14 rotates, and the follower 16 travels along the slot defining means thus providing harmonic linear motion to the article transfer means.

In order to provide stability to the apparatus 10, the base member 12 provides a substantially rectangular floor member 20 with a pair of opposing trapezoidal side walls 22 (only one shown) extending vertically upward from opposite sides of the floor member 20. A top cross member 24 extends between the opposing side walls 22 and is connected to the opposing side walls 22 by conventional fasteners 26. An additional cross member (not shown) extends across the mid portion of the opposing side walls 22 and is also connected to the opposing side walls 22 by conventional fasteners 28. The floor member 20 of the base member 12 may be fastened to a floor, a table or any other support member (not shown) by conventional fasteners 30.

To support rotation of the rotary member 14, the rotary member 14 is mounted to the rotating means for rotational movement about a fixed rotational axis 32. A pair of opposing brackets 34 are connected to the rotating means and are connected to the floor member 20 of the base member 12 through conventional fasteners (not shown). The rotating means provides an electric motor 36 for powering rotational movement of the rotary member 14 about the fixed rotational axis 32. The electric motor 36 rotates the rotary member 14 in discrete, consecutive semi-circular revolutions of 180° at substantially constant rotational speed.

The base member 12 also supports a planar guide means for guiding movement of the article transfer means along a predetermined plane. Preferably, the planar guide means provides a pair of vertically opposed slides 38 connected to the side walls 22 of the base member 12 by conventional fasteners 40 for guiding the article transfer means in a vertically extending plane. The slides 38 have a U-shaped cross-section wherein the open ends 41 of the slides 38 oppose or face one another for receiving the article transfer means. The open ends 41 of the opposing slides 38 are fitted with a low friction material 43 for slidingly receiving the article transfer means. It should be noted that the invention is not limited to the planar guide means extending in a vertical plane, but rather, the planar guide means may guide the article transfer means in any predetermined oriented plane.

To guide the article transfer means within the predetermined vertical plane, the article transfer means provides a vertically extending support plate 42 for slidably engaging the open ends 41 of the slides 38 of the planar guide means. The vertical support plate 42 has a substantially rectangular configuration with a large center portion removed for reducing material cost and weight of the support plate 42. The sides 45 of the vertical support plate 42 have a T-shaped configuration wherein the center of the sides 45 of the support plate 42 extend outward away from the support plate 42 to engage the open ends 41 of the slides 38. At a bottom portion of the vertical support plate 42, a slotted aperture 44 extends therethrough for receiving the follower 16. The slotted aperture 44 has an elliptical configuration with a horizontal longitudinal axis 46 extending the length of the slotted aperture 44. The follower 16 of the rotary member 14 has a cylindrical configuration and is rollably supported on the extending end 18 of the rotary member 14. The follower 16 has a rotational axis 48 that is substantially perpendicular to the longitudinal axis 46 of the slotted aperture 44 and the longitudinal axis of the rotary member 14 as well as being substantially parallel to the rotational axis 32 of the rotary member 14. The follower 16 is received and positioned in the slotted aperture 44 of the support plate 42 such that the follower 16 may roll and travel along the slotted aperture 44 when the rotary member 14 rotates about its rotational axis 32. The mounting of the rotary member 14 and the guiding of the planar guide means ensures that the follower 16 maintains engagement within the slotted aperture 44 of the support plate 42 wherein the follower 16 rollingly engages both the top and bottom of the slotted aperture 44.

The vertical support plate 42 has a mounting bracket 50 located at the top of the vertical support plate 42 for connecting an article transfer apparatus 52 to the vertical support plate 42. Although any type of article transfer apparatus 52 may be connected to the vertical support plate 42, the present invention is best utilized in conjunction with means for conveying an article. As seen in FIGS. 3 and 4, the article conveying means may provide a conveyor 54 having a pair of opposed conveyor tracks 56 for transporting articles (not shown) along a predetermined path of travel. The conveying means also provides a means for independently powering the conveyor 54 wherein the powering means is mounted to the conveying means. The independent powering means may comprise a conventional electric motor 58 that one skilled in the art would recognize.

Figure 2:
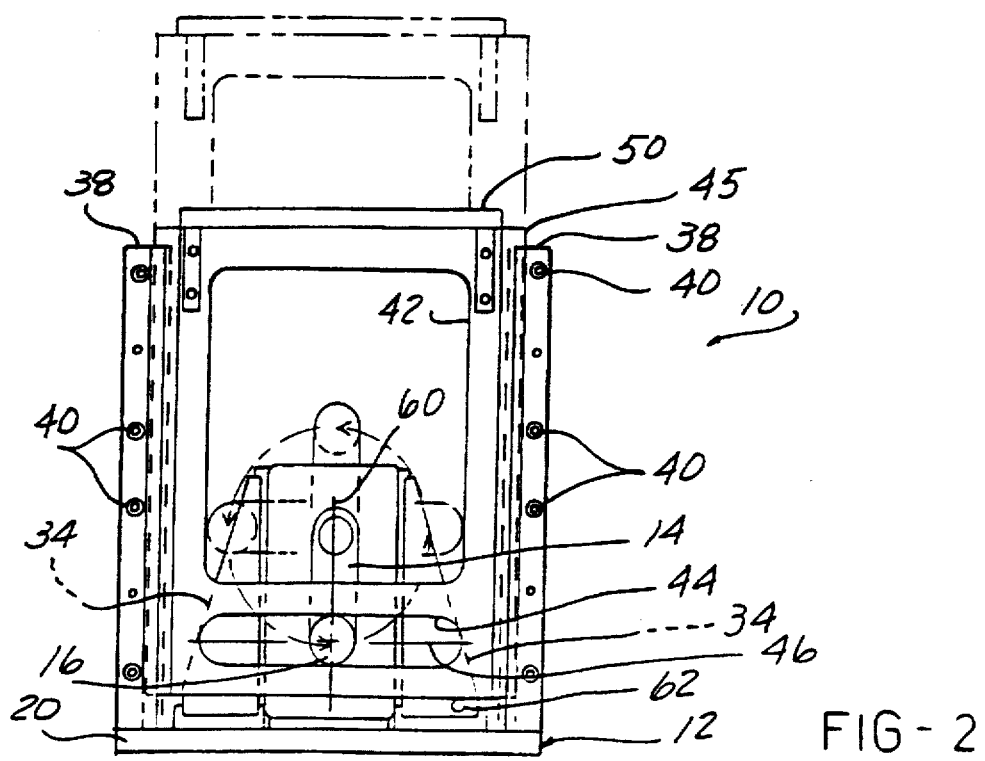
FIG. 2 is a plane front view showing the present invention in the lowered position and showing, in phantom, the present invention in the raised position.

In operation, the apparatus 10 is utilized to move the article transfer apparatus 52 between a first position, wherein the article transfer apparatus 52 is in a raised position as seen in FIG. 1, and a second position, wherein the article transfer apparatus 52 is in a lowered position as seen in FIG. 2. Thus, when the apparatus 10 is in the raised or first position, the rotary member 14 has its longitudinal axis 60 normal to the longitudinal axis 46 of the slotted aperture 44 in the vertical support plate 42, and when the apparatus 10 is in the lowered or second position, the rotary member 14 has its longitudinal axis 60 diametrically opposed to the raised or first position.

To start the apparatus 10 cycling from the first position to the second position, the electric motor 36 may rotate the rotary member 14 at a constant rotational velocity in either direction. For purposes of describing the preferred embodiment, the rotary member 14 is shown rotating in the counterclockwise direction. Thus, as seen in FIG. 5, the support plate 42 begins its limited path of travel from a rested raised or first position wherein the rotary member 14 is at a 0° angle with respect to an origin or start position. As the rotary member 14 rotates, the support plate 42 gradually accelerates, sinusoidally, to a maximum speed over a medial portion of said limited path of travel, wherein the rotary member 14 has its longitudinal axis 60 parallel to the longitudinal axis 46 of the slotted aperture 44 at a 90° angle with respect to the raised or first position. As the rotary member 14 continues to rotate counterclockwise, the follower 16 begins to reciprocate back to the center of the slotted aperture 44, thus gradually decelerating, sinusoidally, the speed of the vertical support plate 42. When the vertical support plate 42 reaches the end of its path of travel, the support plate 42 reaches an effective rested second or lowered position, and the rotary member 14 has its longitudinal axis 60 normal to the longitudinal axis 46 of the slotted aperture 44 at a 180° angle with respect to the raised or first position. Thus, the rotary member 14 has its longitudinal axis 60 diametrically opposed from whence it first started so that the rotary member 14 has completed a discrete semi-circular revolution of 180°.

The apparatus 10 is designed for continual movement of the rotary member 14 in 180° cycles, and thus, the rotary member 14 rotates in the same counterclockwise direction when the rotary member 14 reaches the lowered or second position, as represented by the angular displacement of the rotary member 14 in FIG. 5. Once the rotary member 14 has returned to the vertically upright position, the rotary member 14 stops and may continue to rotate counterclockwise to the lowered or second position. The apparatus 10 may continue to cycle as often as desired.

The apparatus 10 also provides control means 64 for indicating the presence of the support plate 42 at the ends of the limited path of travel of the support plate 42. As seen in FIG. 1, a proximity switch or limit switch 62 is located at the lowered or second position such that when the support plate 42 reaches the lowered or second position, the proximity switch 62 indicates to a programmable controller 64 that the support plate 42 has reached the lowered or second position. An identical proximity switch or limit switch 62 is also utilized at the top of the limited end travel in order to indicate to the control means that the vertical support plate 42 has reached the raised or first position. The control means 64 may respond by stopping, delaying, continuing or controlling the rotation of the rotating member 14

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus comprising:
   means for rotating an elongated unitary rotary member about a fixed rotational axis through at least 360°;
   means, cooperatively engaging said rotary member, for transferring an article from a first position to a second position, where said first position corresponds to a 0° position of said rotary member and said second position corresponds to a 180° position of said rotary member; and
   means for converting rotational movement of said rotary member to harmonic linear motion of said article transfer means for moving said article transfer means in a single back and forth cycle between said first position and said second position for every single 360° turn of said rotary member, said converting means including a follower connected to said unitary rotary member at a first distance from said rotational axis and cooperatively engaging with a cam surface defining a slot having a first end and a second end, where said follower is disposed substantially midway between said first and second ends when said unitary rotary member is at said first position and said second position.

2. The apparatus stated in claim 1, wherein said converting means further comprises:
   said follower pivotally connected to an extending end of said rotary member;
   planar means for guiding movement of said article transfer means along a predetermined plane; and
   said slot defined within said article transfer means, said follower moving along said slot when said rotary member rotates and moves said article transfer means linearly along said planar guide means.

3. The apparatus as stated in claim 1, wherein said rotating means further comprises:
   a motor for powering rotational movement of said rotary member about said fixed rotational axis at a substantially constant rotary speed.

4. The apparatus as stated in claim 2, wherein said article transfer means further comprises:
   a support plate slidably engaging said planar guide means; and
   an article transfer apparatus connected to said support plate.

5. The apparatus as stated in claim 4, wherein said article transfer apparatus further comprises:
   means for conveying an article; and
   means for powering said conveying means independent of said rotating means.

6. The apparatus as stated in claim 2, wherein said planar guide means guides said article transfer means in movement along a vertically extending plane.

7. An apparatus comprising:
   an elongated rotary member mounted for rotational movement about a fixed rotational axis;
   means for powering rotational movement of said rotary member about said fixed rotational axis at a substantially constant rotary speed;
   a follower pivotally connected to an extending end of said rotary member at a first distance spaced from said fixed rotational axis;
   a planar support plate having a single slotted aperture for cooperatively receiving said follower of said rotary member, said slotted aperture at least twice as long as said first distance;
   means for guiding planar movement of said support plate within a predetermined plane;
   said rotary member rotating and moving said follower along said slotted aperture of said support plate wherein said rotary member and said follower move said support plate along said planar guide means in a limited path of travel wherein said support plate starts from an effective first rest position and gradually accelerates, sinusoidally, to a maximum speed over a medial portion of said limited path of travel and then decelerates, sinusoidally, to an effective second rest position at the end of said limited path of travel wherein the ends of said limited path of travel of said support plate correspond to diametrically opposed positions of said rotary member wherein said follower is substantially midway between opposite ends of said slotted aperture; and
   means for transferring an article wherein said article transfer means is connected to said support plate for movement of said article transfer means between said first position and said second position.

8. The apparatus as stated in claim 7, wherein said article transfer means comprises:
   means for conveying an article; and
   means, mounted to said article conveying means, for powering said conveying means independent of said rotational movement powering means.

9. The apparatus as stated in claim 7, wherein said powering means further comprises:
   a motor for powering rotational movement of said rotary member about said fixed rotational axis in discrete semi-circular revolutions of 180° at a substantially constant rotary speed.

10. The apparatus as stated in claim 7, wherein said planar guide means guides said support plate in a vertically extending plane.

11. The apparatus as stated in claim 7, further comprising:
    control means for indicating the presence of said support plate at said first position and said second position.

12. An apparatus comprising:
    a base member;
    an elongated rotary member having a longitudinal axis and being supported by said base member, and said rotary member mounted for rotational movement about a fixed rotational axis;
    means for powering rotational movement of said rotary member at a substantially constant rotary speed;
    a single cylindrical follower rollably supported on an extending end of said rotary member at a first distance spaced from said fixed rotational axis;

a vertical support plate having a slotted aperture extending therethrough and said slotted aperture having a horizontal longitudinal axis for rollingly receiving said follower, said slotted aperture at least twice as long as said first distance;

planar means for slidingly guiding said support plate within a vertically extending plane;

said rotary member reciprocally rotating between a first position, wherein said longitudinal axis of said rotary member is normal to said longitudinal axis of said slotted aperture of said support plate, and a second position, wherein said longitudinal axis of said rotary member is diametrically opposed from said first position;

said rotary member and said follower moving said support plate along a limited path of travel wherein said support plate starts from an effective first rest position and gradually accelerates, sinusoidally, to a maximum speed over a medial portion of said limited path of travel and decelerates, sinusoidally, to an effective second rest position at the end of said limited path of travel wherein said ends of said limited path of travel of said support plate correspond to said diametrically opposed first and second positions of said rotary member wherein said follower is substantially midway between opposite ends of said slotted aperture; and means for transferring an article wherein said article transfer means is connected to said support plate for movement of said article transfer means between said first position and said second position.

13. The apparatus as stated in claim 12, wherein said article transfer means comprises:

means for conveying an article; and means, mounted to said conveying means, for powering said conveying means.

14. The apparatus as stated in claim 13, wherein said conveying means comprises:

a conveyor for conveying articles along a path of travel.

15. The apparatus as stated in claim 12, further comprising:

control means for indicating the presence of said support plate at said first position and said second position.

16. The apparatus as stated in claim 15, wherein said indicating control means comprises:

a proximity switch at said first position and said second position to indicate the presence of said support plate.

17. The apparatus stated in claim 15, wherein said inditcating control means comprises:

a limit switch at said first position and said second position to indicate the presence of said support plate.

18. The apparatus stated in claim 12, wherein said powering means comprises:

an electric motor powering rotational movement of said rotary member about said fixed rotational axis in discrete semi-circular revolution cycles of 180° at a substantially constant rotary speed with the direction of rotation of said rotary member during each cycle being the same as its direction of rotation during the preceding cycle.

19. The apparatus stated in claim 12, wherein said planar guide means comprises:

a pair of opposed, substantially parallel, low friction slides extending vertically upward and connected to said base for slidingly supporting movement of said support plate in said vertical plane.

* * * * *